US007265500B2

(12) United States Patent
Ono et al.

(10) Patent No.: US 7,265,500 B2
(45) Date of Patent: Sep. 4, 2007

(54) BACKLIGHT ASSEMBLY FOR DIRECTLY BACKLIGHTING DISPLAYS

(75) Inventors: Shin-ichirou Ono, Kanagawa (JP); Hirokazu Fukuyoshi, Kanagawa (JP)

(73) Assignee: NEC Corporation, Tokyo (JP)

( * ) Notice: Subject to any disclaimer, the term of this patent is extended or adjusted under 35 U.S.C. 154(b) by 98 days.

(21) Appl. No.: 10/849,433

(22) Filed: May 19, 2004

(65) Prior Publication Data

US 2004/0246394 A1 Dec. 9, 2004

(30) Foreign Application Priority Data

May 21, 2003 (JP) ............................. 2003-142952

(51) Int. Cl.
*H05B 37/02* (2006.01)
(52) U.S. Cl. .................. 315/291; 362/225; 349/70
(58) Field of Classification Search ............. 315/169.3, 315/291, 246, 276, 307, 294, 209 PZ; 362/217, 362/225; 349/61, 70, 56, 58, 151
See application file for complete search history.

(56) References Cited

U.S. PATENT DOCUMENTS

| | | | | |
|---|---|---|---|---|
| 5,333,073 A | * | 7/1994 | Suzuki ..................... | 349/59 |
| 6,266,119 B1 | * | 7/2001 | Takahashi et al. .......... | 349/151 |
| 6,417,833 B1 | | 7/2002 | Takemoto ................... | 345/102 |
| 6,654,088 B2 | * | 11/2003 | Morishita et al. ........... | 349/113 |
| 6,674,250 B2 | * | 1/2004 | Cho et al. ................... | 315/291 |
| 6,680,588 B2 | * | 1/2004 | Park et al. .................. | 315/312 |
| 6,825,828 B2 | * | 11/2004 | Burke et al. ................ | 345/101 |
| 6,922,023 B2 | * | 7/2005 | Hsu et al. ................... | 315/291 |
| 6,949,890 B2 | * | 9/2005 | Chou et al. ................. | 315/294 |
| 6,986,598 B2 | * | 1/2006 | Chu et al. ................... | 362/561 |
| 2002/0149713 A1 | | 10/2002 | Ishida et al. ................ | 349/58 |
| 2002/0149719 A1 | | 10/2002 | Kanatsu et al. ............. | 349/112 |

FOREIGN PATENT DOCUMENTS

| | | |
|---|---|---|
| JP | 4-84122 | 3/1992 |
| JP | 2002-132193 | 5/2002 |
| JP | 2002-311418 | 10/2002 |
| KR | 2001-7304 | 1/2001 |
| TW | 526354 | 4/2003 |

\* cited by examiner

*Primary Examiner*—Tuyet Vo
*Assistant Examiner*—Ephrem Alemu
(74) *Attorney, Agent, or Firm*—Scully, Scott, Murphy & Presser, P.C.

(57) ABSTRACT

A backlight assembly comprises a plurality of linear light sources arranged in parallel behind a display screen. The plurality of linear light sources is divided into a first group and a second group. The linear light sources belonging to the first group are oriented in a first direction. The linear light sources belonging to the second group are oriented in a second direction opposite to the first direction. The backlight assembly comprises a first inverter substrate for driving the linear light sources belonging to the first group, and a second inverter substrate for driving the linear light sources belonging to the second group. The first and second substrates are arranged on one side of the linear light sources and the opposite side thereof, respectively.

10 Claims, 8 Drawing Sheets

BACKLIGHT ASSEMBLY FOR DIRECTLY BACKLIGHTING DISPLAYS

BACKGROUND OF THE INVENTION

1. Field of the Invention

The present invention relates to backlight assemblies, and more particularly to backlight assemblies for directly backlighting displays.

2. Description of Related Art

Display devices such as liquid crystal displays (LCDs) are commonly used for displays for many electronic devices such as monitors of office automatic (OA) equipment, and monitors of televisions, all applications where light weight, low power, and a flat panel display are desired. An LCD is essentially a light switching device that does not emit any light on its own and displays information by controlling the state of orientation of the liquid crystal molecules, which in turn controls the transmission of light. LCDs may be divided into three types: reflective, transflective and transmissive. Reflective LCDs use ambient light, and requires no backlighting. However, transmissive and transflective LCDs require backlighting. A backlight or backlights are provided to enhance contrast and to enable visibility of information. The backlighting may be enabled using different lighting technologies, depending on the size and usage of the display.

For example, in most desktop monitors and televisions, backlighting may be provided by a number of linear light sources in the form of cold cathode florescent lamps arranged in parallel, with a back reflector to enhance efficiency, and a light diffusing or diffuser layer to provide more uniform illumination to the liquid crystal display. Examples are disclosed in US 2002/0149713 A1 (=JP 14-311418) and US 2002/0149719 A1. For thinner displays, e.g., those used in a laptop computer, small diameter cold cathode fluorescent lamps are situated at one end or at opposing ends of a light guide, which directs the light towards the liquid crystal device. One example is disclosed in JP 04-84122 A.

FIGS. 7 and 8 illustrate an LCD 10 according to the prior art. An exploded view in FIG. 7 illustrates an LCD panel 12, a backlight assembly 14 and a front cover 16. The LCD panel 12 is connected to substrates 18 via transmission control protocols (TCPs) 20. An exploded view in FIG. 8 illustrates the backlight assembly 14.

Referring to FIG. 8, the backlight assembly 14 includes a light emitting structure 22, a support structure 24, a reflector plate 26, a diffuser panel 28, an optical sheet 30 having a light diffusing feature, and a chassis 32. The light emitting structure 22 includes a plurality of linear light sources in the form of cold cathode fluorescent lamps 34 arranged and connected in parallel between an inverter substrate 36 and a return substrate 38, which are interconnected by a return cable 40. FIG. 9 is a circuit diagram.

As shown in FIG. 9, the inverter substrate 36 has a dc power input port 42 connected to a dc power source such as a rechargeable battery, not shown. The inverter substrate 36 also has a plurality, corresponding in number to the plurality of cold cathode fluorescent lamps 34, of high ac voltage output connectors 44. The inverter substrate 36 further has a control signal input port 46. The inverter substrate 36 has a return port 48. In FIG. 9, the reference numeral 50 indicates a dc voltage from the rechargeable battery, the reference numeral 52 a ground line and the reference numeral 54 various inverter control signals. A plurality, corresponding in number to the plurality of cold cathode fluorescent lamps 34, of inverter circuits, generally indicated at 56, are formed on the inverter substrate 36 as drivers for driving cold cathode florescent lamps 34.

As is well known, starting and operating a cold cathode florescent lamp requires a high alternating current ("ac") voltage. Typical starting voltage is around 1,000 volts AC, and typical operating voltage is about 600 volts AC. To generate such a high ac voltage from a dc power source such as a rechargeable battery, an inverter circuit includes a dc-to-ac inverter having a step-up transformer. Such inverter circuit is described in U.S. Pat. No. 6,630,797 B2 issued to Qian et al., which has been incorporated herein by reference in its entirety.

Each of the cold cathode fluorescent lamps 34 has a high-voltage end and a low-voltage end. At the high-voltage end, each lamp 34 is connected via a high-voltage cable 58 to one of high ac voltage output connectors 44. The low-voltage ends of the cold cathode fluorescent lamps 34 are interconnected within the return substrate 38 and connected via the return cable 40 to the return port 48 of the inverter substrate 36. The return port 48 is grounded.

In FIG. 9, a relatively large phantom-line drawn rectangle 60 illustrates the module size of LCD 10, while a relatively small phantom-line drawn rectangle 62 illustrates the size of display screen.

In the backlit LCD, in a bright ambient viewing environment, reflections from the display screen may reduce the observed contrast significantly, despite the inherently high transmission contrast, which is currently available. Such effects may be partially offset by increasing the backlight intensity by increased number of cold cathode florescent lamps 34, which may be arranged in parallel within the two-dimensional area of display screen as shown in FIG. 10.

Step-up transformers corresponding in number to the increased number of cold cathode fluorescent lamps 34 are required. Each of the step-up transformers must be situated in the proximity of the associated one of the cold cathode florescent lamps 34. A transmission loss would otherwise occur to cause a drop in alternating voltage. Besides, interconnecting each of the step-up transformers and one of the cold cathode florescent lamps 34 by extending a high-voltage cable to pass areas between other electrical components might cause serious ill-effect on them. However, the step-up transformers are difficult to arrange near the high-voltage ends of the cold cathode florescent lamps, respectively. This difficulty would grow if bulkier step-up transformers are needed to produce higher starting and operating voltages.

Arranging a plurality of step-up transformers requires accounting for the minimum distance between the adjacent two to avoid undesired interference. This minimum distance may be called "the minimum transformer pitch". Arranging a plurality of cold cathode florescent lamps in parallel requires accounting for a distance between the adjacent two. This distance between the adjacent two lamps may be called "lamp pitch". Keeping the lamp pitch held greater than or equal to the minimum transformer pitch poses no problem in arranging the step-up transformers in line in a vertical, with respect to the display screen, direction in which the cold cathode florescent lamps are spaced. Because the length of inverter substrate will not exceed the dimension of display screen measured in the vertical direction. However, there are problems if the lamp pitch is greater than the minimum transformer pitch.

The first problem is that an inverter substrate inevitably exceeds the dimension of display screen measured in the vertical direction to thereby cause an increase in size of the entire backlight assembly. There is growing demand for a LCD having a larger display screen. A backlight assembly for such larger display screen uses longer cold cathode florescent lamps arranged in parallel, thus requiring larger step-up transformers. As the step-up transformers are larger, the inverter substrate exceeds further the vertical dimension of the larger display screen against the design trend of narrowing the area surrounding the display screen.

The second problem is in the brightness variance within the display screen such that the brightness becomes less with increased distance from the high-voltage end of each of the cold cathode florescent lamps arranged in parallel thereby resulting in less uniform output distribution. This brightness variance grows beyond a negligible level if a display area becomes larger.

These problems are posed also in an application where a backlight assembly is required to illuminate two display screens between which the backlight assembly is interposed.

It would to desirable to produce a backlight assembly free from the above-mentioned problems.

SUMMARY OF THE INVENTION

According to one aspect of the present invention, a backlight assembly comprises a plurality of linear light sources arranged in parallel behind a display screen. The plurality of linear light sources is divided into a first group and a second group. The linear light sources belonging to the first group are oriented in a first direction. The linear light sources belonging to the second group are oriented in a second direction opposite to the first direction. The backlight assembly comprises a first inverter substrate for driving the linear light sources belonging to the first group, and a second inverter substrate for driving the linear light sources belonging to the second group. The first and second substrates are arranged on one side of the linear light sources and the opposite side thereof, respectively.

DETAILED DESCRIPTION OF TEE INVENTION

Figure 1:
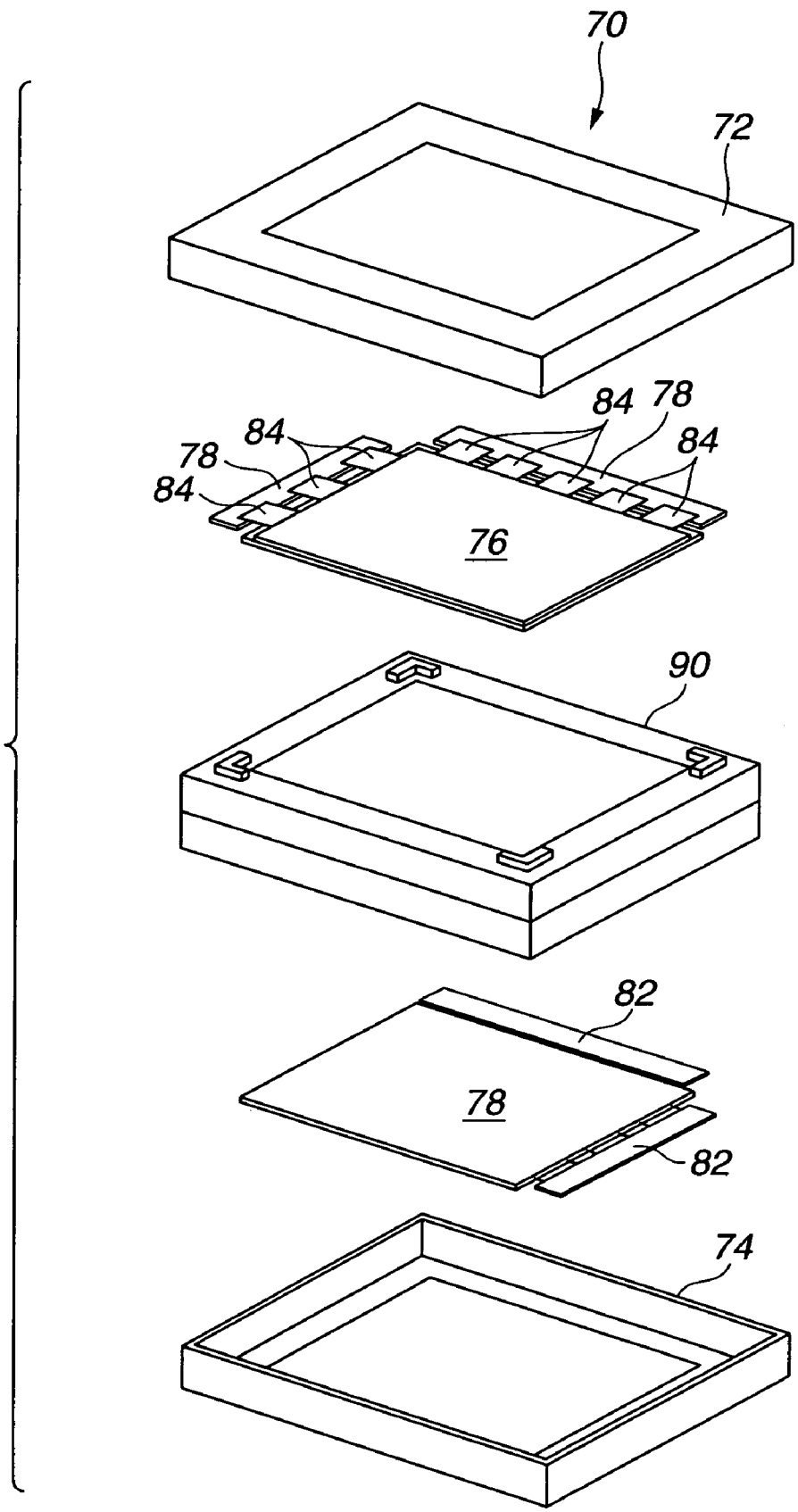
FIG. 1 is an exploded perspective view illustrating a LCD including a backlight assembly interposed between two LCD panels.
Figure 2:
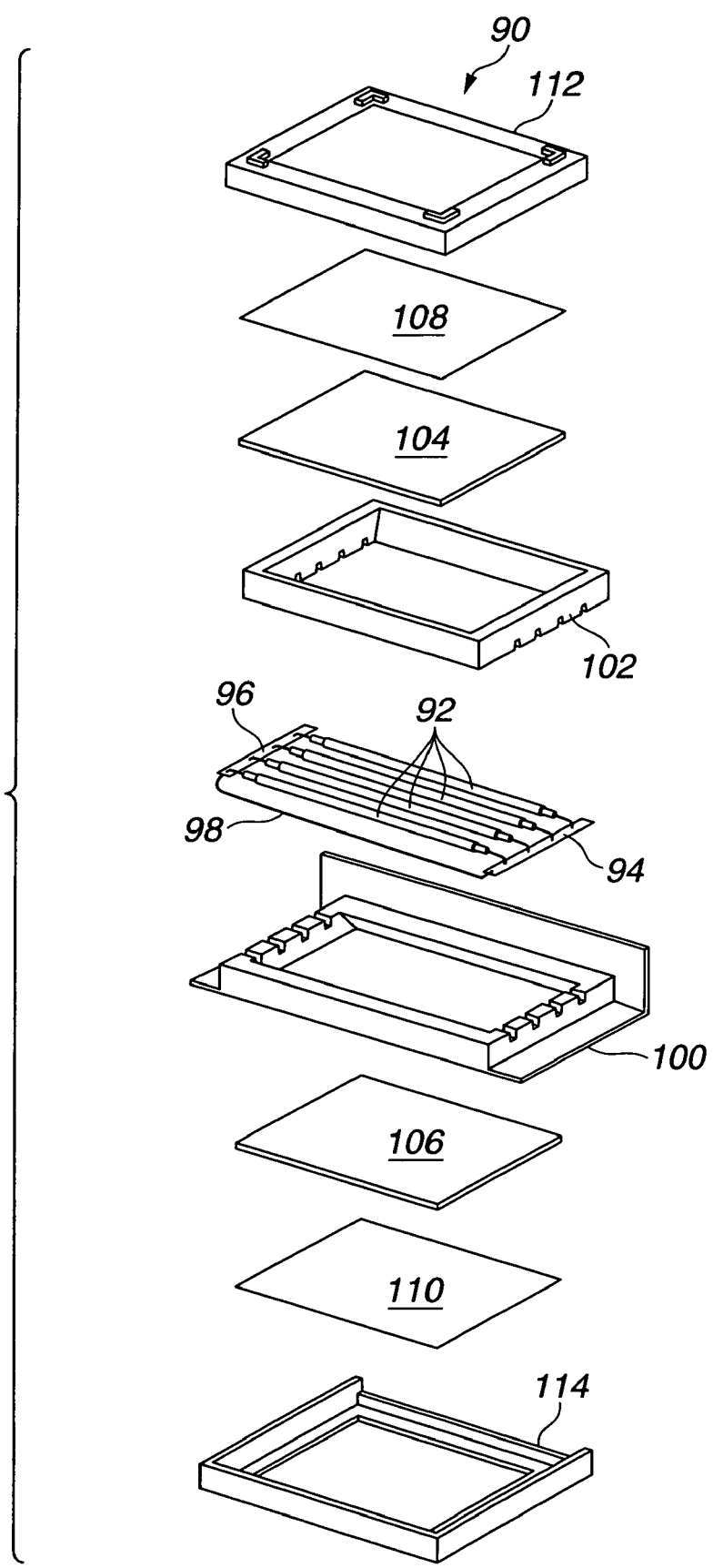
FIG. 2 is an exploded perspective view of the backlight assembly shown in FIG. 1.

Referring to the accompanying drawings, FIGS. 1 and 2 illustrate a liquid crystal display (LCD), in which various embodiments of backlight assembly according to the present invention may be applied.

In FIG. 1, the LCD is generally indicated by the reference numeral 70. The LCD 70 includes a backlight assembly 90. This backlight assembly 90 can illuminate both front and rear surfaces thereof. The LCD 70 includes two LCD panels 76 and 78. The LCD panel 76 is connected via transmission control protocols (TCPs) 84 to two substrates 78. The LCD 78 is connected via TCPs, not shown, to two substrates 82. The LCD 70 also includes front covers 72 and 74 clamped to each other to accommodate therein the backlight assembly 90 and two LCD panels 76 and 78. FIG. 2 illustrates the backlight assembly 90.

Referring to FIG. 2, the backlight assembly 90 includes a plurality of linear light sources 92 arranged in parallel between an inverter substrate 94 and a return substrate 96. The return substrate 96 is connected via a return cable 98 to a ground region of the inverter substrate 94. The linear light sources 92 may be in the form of cold cathode florescent lamps. The cold cathode florescent lamps 92 are interposed between halves 100 and 102 of a lamp support structure. The backlight assembly 90 includes light diffusing panels 104 and 106. The light diffusing panels 104 and 106 defines the front and rear surfaces of the backlight assembly 90. The backlight assembly 90 includes an optical sheet 108 on the light diffusing panel 104 and another optical sheet 110 on the light diffusing panel 106. The optical sheets 108 and 110 may be a light diffusing film or a lens film. Chassis halves 112 and 114 are pressed into engagement with each other to accommodate the components mentioned above.

Figure 3:
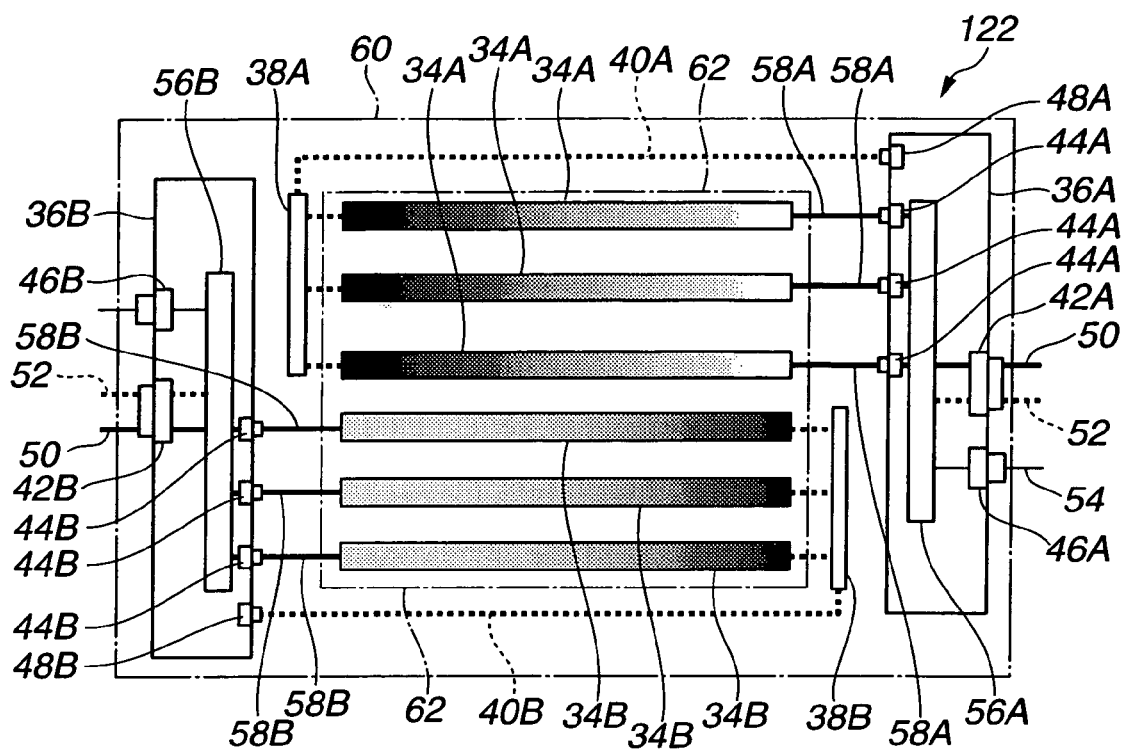
FIG. 3 is a schematic plan view of one embodiment of backlight assembly according to the present invention.

FIG. 3 illustrates one embodiment of backlight assembly 122 according to the present invention. The backlight assembly 122 includes a plurality, six in this embodiment, of linear light sources in the form of cold cathode florescent lamps 34A and 34B arranged in parallel behind a display screen defined by the phantom-line drawn rectangle 62. In FIG. 3, a relatively large phantom-line drawn rectangle 60 illustrates the module size of LCD 122.

The cold cathode florescent lamps 34A and 34B may be divided into a first group A consisting of cold cathode florescent lamps 34A and a second group B consisting of cold cathode florescent lamps 34B. The cold cathode florescent lamps 34A belonging to the first group A have their high-voltage ends oriented in a first direction. The other cold cathode florescent lamps 34B belonging to the second group B have their high-voltage ends oriented in a second direction opposite to the first direction. The backlight assembly 122 includes a first inverter substrate 36A and a first return substrate 38A, which belong to the first group A. The backlight assembly 122 includes a second substrate 36B and a second return substrate 38B, which belong to the second group B.

As shown in FIG. 3, the first inverter substrate 36A includes a first dc power input port 42A connected to a dc power source such as a rechargeable battery, not shown. The first inverter substrate 36A includes a plurality, corresponding in number to the plurality of cold cathode fluorescent lamps 34A, of first high ac voltage output connectors 44A. The first inverter substrate 36A includes a first control signal input port 46A. The first inverter substrate 36A has a first return port 48A that is grounded. The reference numeral 50 indicates a dc voltage from the rechargeable battery, the reference numeral 52 a ground line and the reference numeral 54 various inverter control signals. The inverter control signals include a dimmer control signal, an ON/OFF switch signal and an external PCM signal. A plurality, corresponding in number to the plurality of cold cathode fluorescent lamps 34A, of inverter circuits, generally indicated at 56A, are formed on the first inverter substrate 36A as drivers for driving cold cathode florescent lamps 34A.

Each of the cold cathode fluorescent lamps 34A belonging to the first group A has a high-voltage end in the proximity of the first inverter substrate 36A and a low-voltage end remotest from the first inverter substrate 36A. At the high-voltage end, each lamp 34A is connected via a first high-voltage cable 58A to one of first high ac voltage output connectors 44A. The low-voltage ends of the cold cathode fluorescent lamps 34A are interconnected within the return substrate 38 and connected via a first return cable 40A to the return port 48A of the first inverter substrate 36A. From the first return substrate 38A, the first return cable 40A extends along the entire length of the cold cathode fluorescent lamps 34A and 34B to the first return port 48A of the first inverter substrate 36A.

With continuing reference to FIG. 3, the second inverter substrate 36B includes a second dc power input port 42B connected to the dc power source. The second inverter substrate 36B includes a plurality, corresponding in number to the plurality of cold cathode fluorescent lamps 34B, of second high ac voltage output connectors 44B. The second inverter substrate 36B includes a second control signal input port 46B. The second inverter substrate 36 has a second return port 48B that is grounded. A plurality, corresponding in number to the plurality of cold cathode fluorescent lamps 34B, of inverter circuits, generally indicated at 56B, are formed on the second inverter substrate 36B as drivers for driving cold cathode florescent lamps 34B.

Each of the cold cathode fluorescent lamps 34B belonging to the second group B has a high-voltage end in the proximity of the second inverter substrate 36B and a low-voltage end remotest from the second inverter substrate 36B. At the high-voltage end, each lamp 34B is connected via a second high-voltage cable 58B to one of second high ac voltage output connectors 44B. The low-voltage ends of the cold cathode fluorescent lamps 34B are interconnected within the return substrate 38B and connected via a second return cable 40B to the return port 48B of the second inverter substrate 36B. From the second return substrate 38B, the second return cable 40B extends along the entire length of the cold cathode fluorescent lamps 34A and 34B to the second return port 48B of the second inverter substrate 36A.

The first and second inverter substrates 36A and 36B may preferably be of the same construction for reduction of fabrication cost although they may differ from each other.

The first and second inverter substrates 36A and 36B receive electric energy via the respective first and second dc power input ports 42A and 42B. In response to control signals via the first control signal input port 46A, the inverter circuits 56A on the first inverter substrate 36A drive the cold cathode florescent lamps 34A of the first group A, respectively. In response to control signals via the second control signal input ports 46B, the inverter circuits 56B on the second inverter substrate 36B drive the cold cathode flores-cent lamps 34B of the second group B, respectively.

The first and second inverter substrates 36A and 36B are arranged on one side of the plurality of cold cathode florescent lamps 34A and 34B and the opposite side thereof, respectively. In other words, they are situated on one and the opposite sides of the display screen 62, respectively. This parallel arrangement across the display screen 62 is superior to the series arrangement of them on one side of the display screen 62 because it allows a denser concentration of cold cathode florescent lamps over the two-dimensional area of the display screen 62 without increasing the modular size 60 of LCD 122. In plain words, the parallel arrangement of inverter substrates across a display screen provides an LCD having a brighter and wider display screen surrounded by a narrower frame.

The above-mentioned parallel arrangement of the plurality of substrates 36A and 36B across the display screen 62 has been accomplished by orientating at least one selected from the cold cathode florescent lamps 34A and 34B in a first direction and at least another one selected from them in a second direction opposite to the first direction. For example, as shown in FIG. 3, all of cold cathode fluorescent lamps situated within an area portion the display screen 62 may be oriented in the first direction and all of cold cathode florescent lamps situated within the remaining area portion of the display screen 62 may be oriented in the second direction.

Varying the density and orientation of the cold cathode florescent lamps 34A and 34B are necessary to provide a uniform light output. The feature of a cold cathode florescent lamp that the amount of light emitted will be greater in areas closer to its high-voltage end than in other areas further remove from the high voltage end may be advantageously used, for example, by increasing the cycle of alternating orientation of the cold cathode fluorescent lamps 34A and 34B, thereby resulting in a more uniform light output distribution from the display screen. For example, in FIG. 3, the cycle of alternating orientation of the cold cathode fluorescent lamps 34A and 34B is one. In each of FIGS. 4-6, the cycle of alternating orientation of the cold cathode fluorescent lamps 34A and 34B is three.

Figure 4:
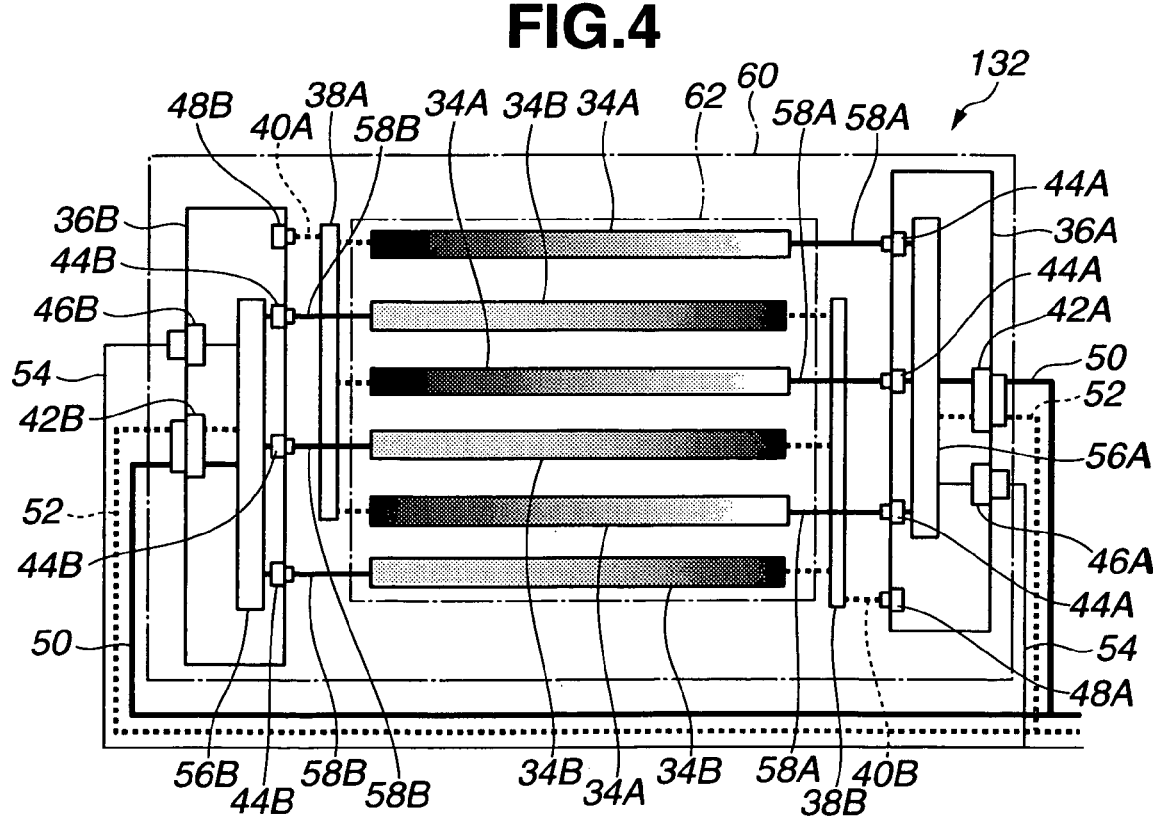
FIG. 4 is a schematic plan view of another embodiment of backlight assembly according to the present invention.

FIG. 4 illustrates another embodiment of backlight assembly 132 according to the present invention. The backlight assembly 132 is substantially the same as the backlight assembly 122 shown in FIG. 3 except that, in FIG. 3, the cycle of alternating orientation of the cold cathode fluorescent lamps 34A and 34B is one, while in FIG. 4, the cycle of alternating orientation of the cold cathode fluorescent lamps 34A and 34B is three and the adjacent two selected out of the plurality of lamps 34A and 34B are oriented in the first and second directions, respectively. Another difference is that return cables 40A and 40B have been shortened by connecting a first return substrate 38A to a second return port 48B of the adjacent second inverter substrate 363 and by connecting a second return substrate 38B to a first return port 48A of a first inverter substrate 36A. Still another difference is that the first and second inverter substrates 36A and 36B are connected to bus lines.

Figure 5:
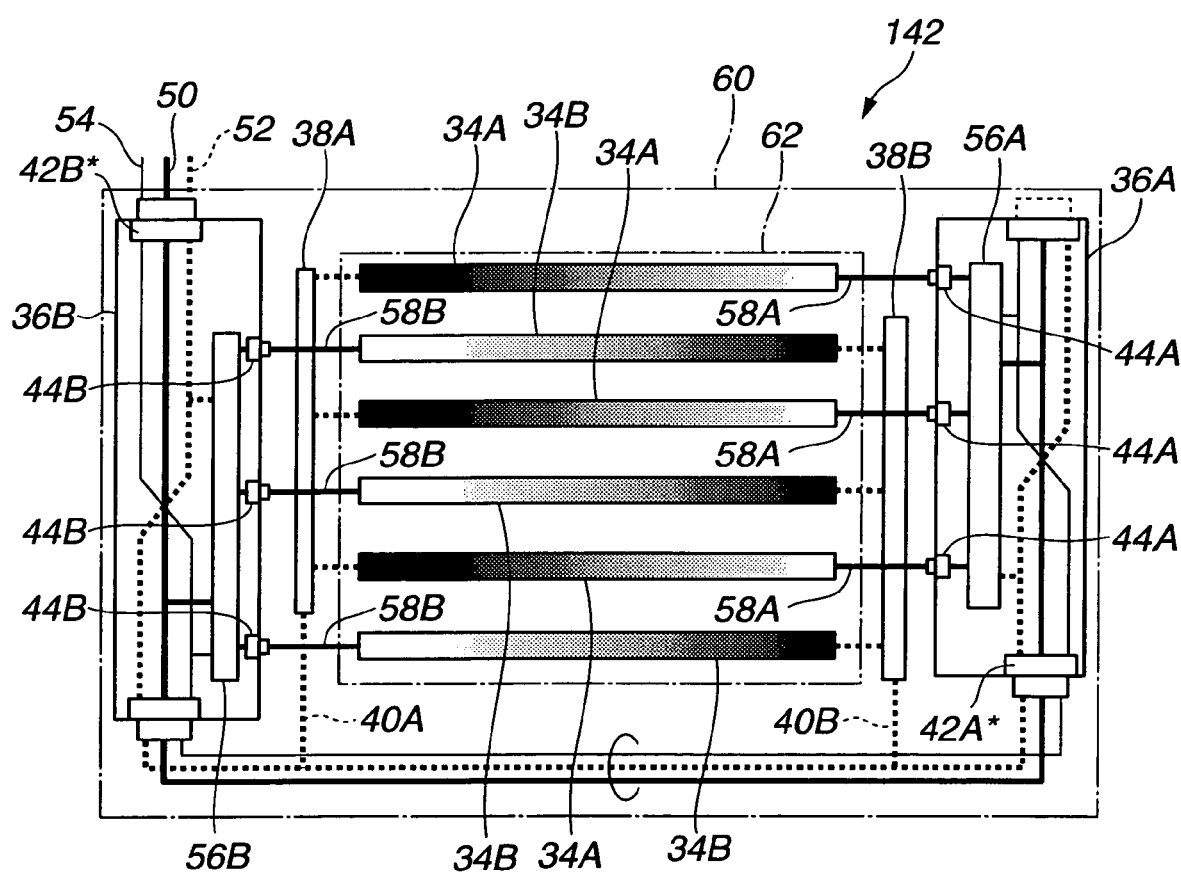
FIG. 5 is a schematic plan view of another embodiment of backlight assembly according to the present invention.

FIG. 5 illustrates another embodiment of backlight assembly 142 according to the present invention. The backlight assembly 142 is substantially the same as the backlight assembly 132 except the structure of an inverter substrate 36A or 38A. Another difference is that, in FIG. 5, return cables 40A and 40B are connected to a bus ground line, while, in FIG. 4, the return cables 40A and 40B are connected to the second and first return ports 48B and 48A.

Referring to FIG. 5, each of inverter substrates 36A and 36B has two identical connectors or ports that are internally interconnected and can receive or communicate with a dc voltage 50, a ground line 52 and various inverter control signals 54. The second inverter substrate 36B uses one of two such ports as a port 42B*, which receives or commu-nicates with a dc voltage 50, ground potential and various inverter control signals 54. The second inverter substrate 36B uses the other port as a port for connection with bus lines. The first inverter substrate uses one of two such ports as a port 42A* for connection with the bus lines to receive or communicate with dc voltage 50, ground potential and various inverter control signals 54. The other port of the first inverter substrate is not used.

Figure 6:
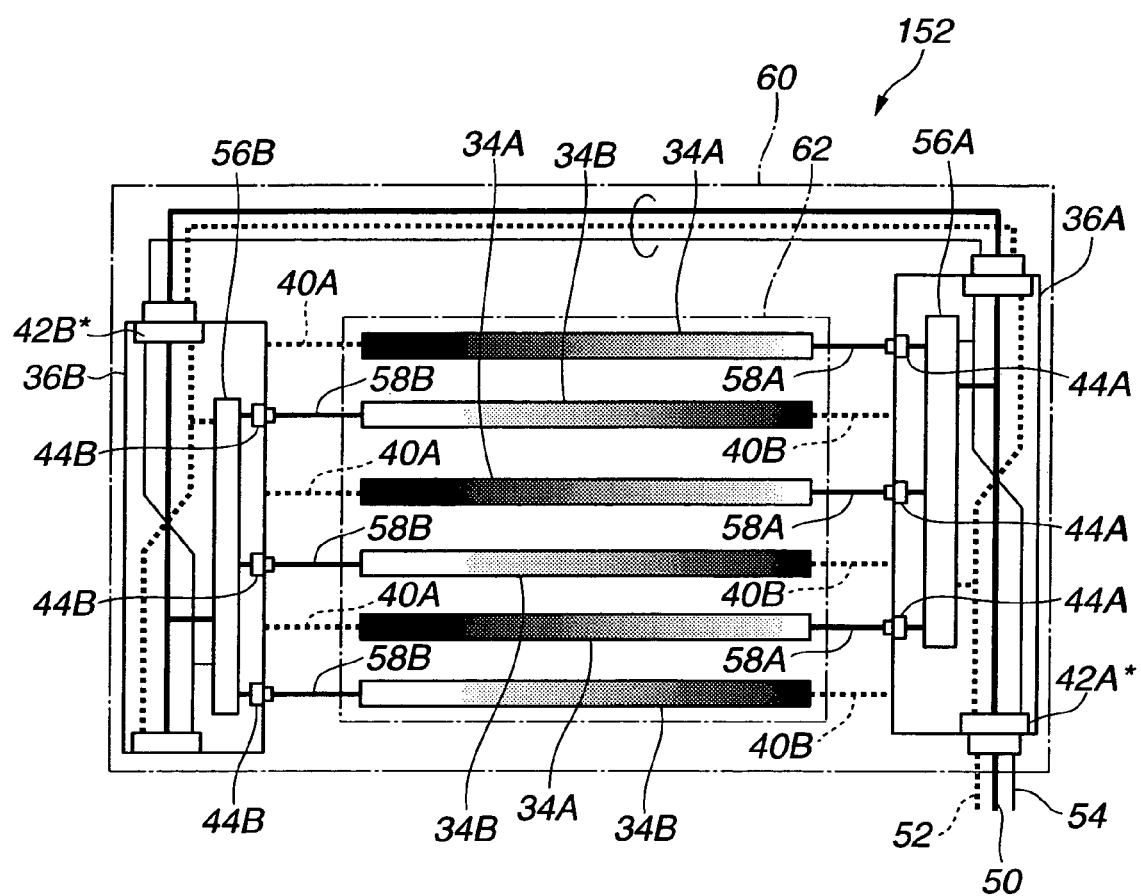
FIG. 6 is a schematic plan view of another embodiment of backlight assembly according to the present invention.
Figure 7:
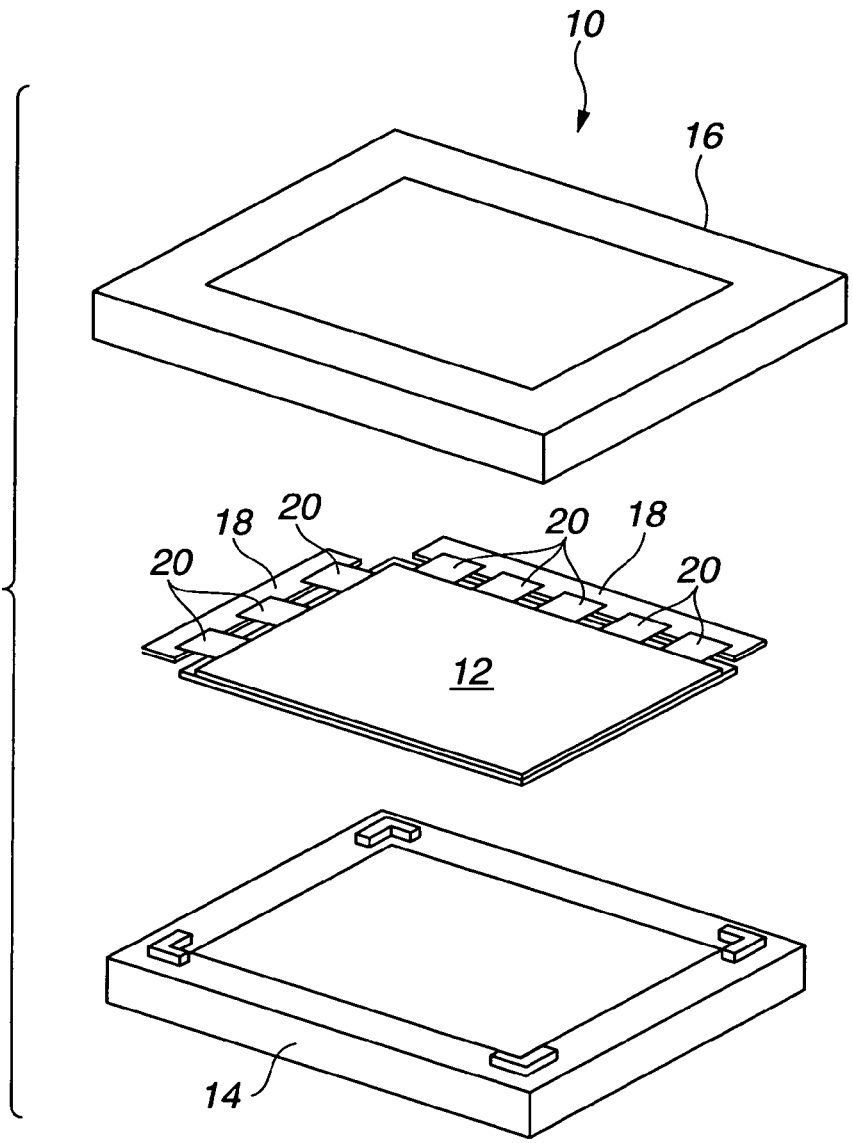
FIG. 7 is an exploded perspective view of a LCD including a backlight assembly according to the prior art.
Figure 8:
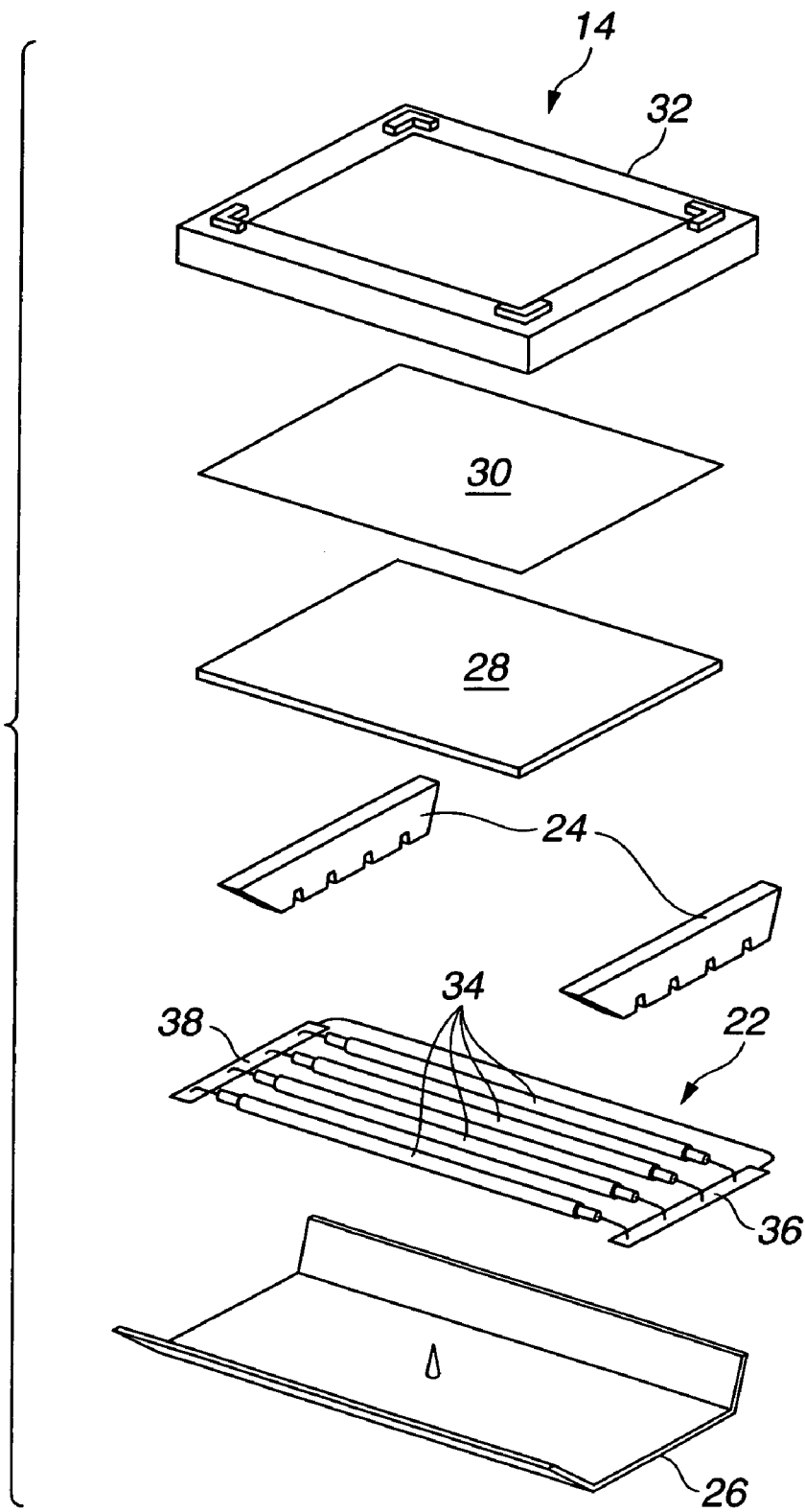
FIG. 8 is an exploded perspective view of the backlight assembly shown in FIG. 7.
Figure 9:
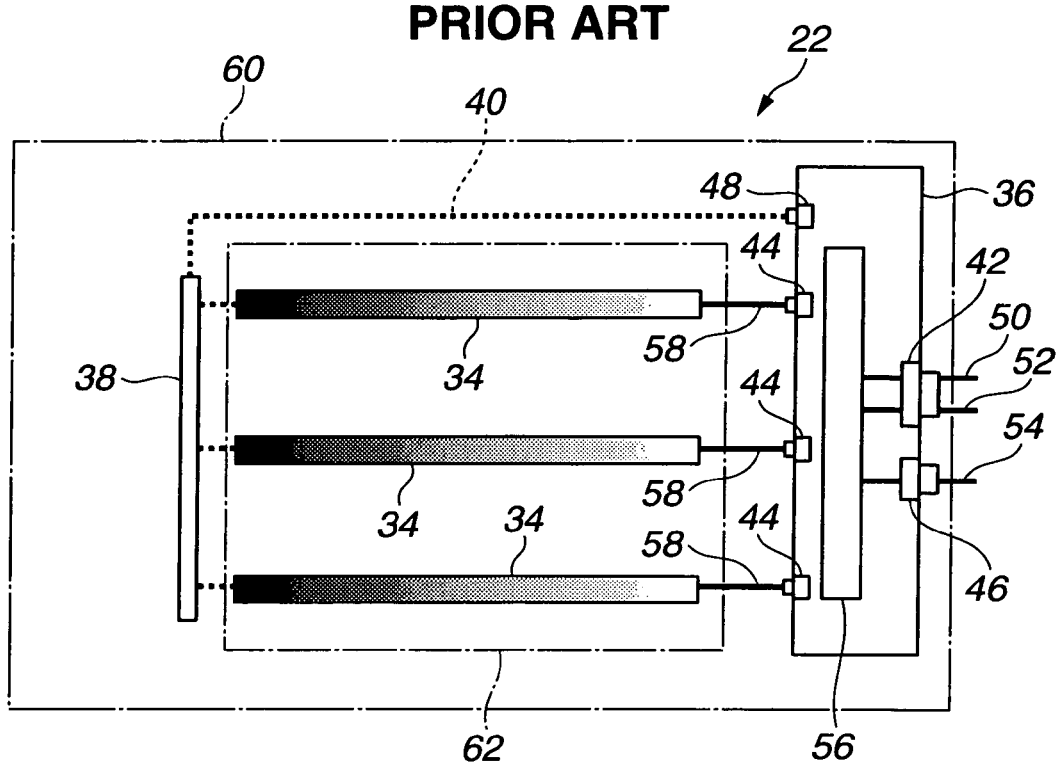
FIG. 9 is a schematic plan view of one form of backlight assembly according to the prior art.
Figure 10:
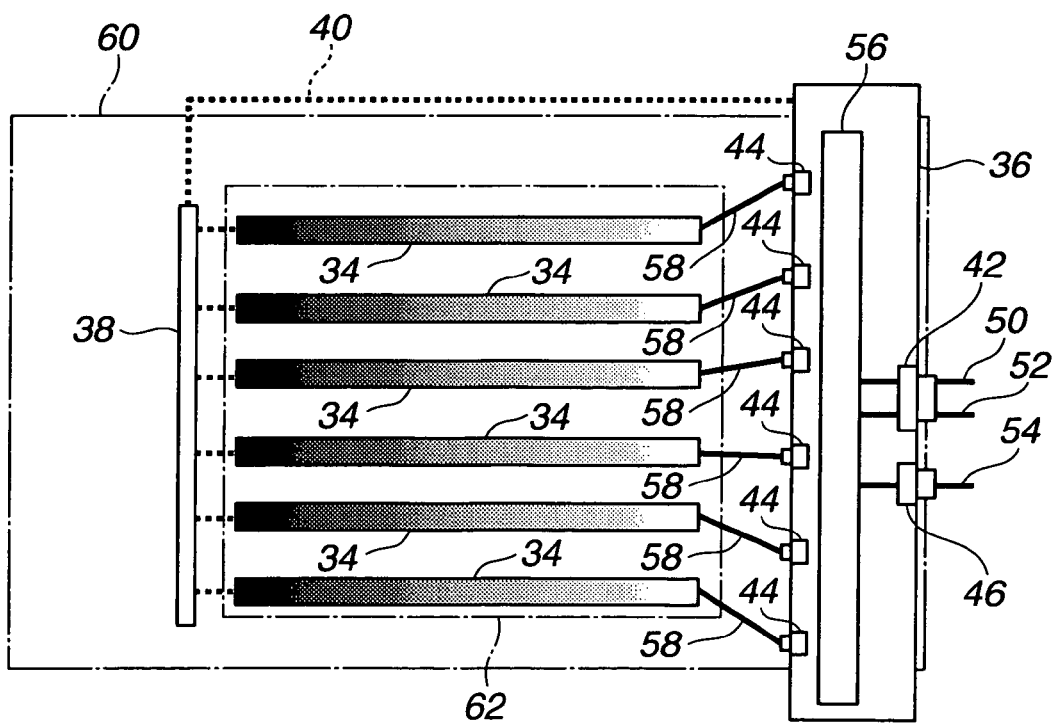
FIG. 10 is a schematic plan view of another form of backlight assembly according to the prior art.

FIG. 6 illustrates another embodiment of backlight assembly 152 according to the present invention. The backlight assembly 152 is substantially the same as the backlight assembly 142 except that first and second return cables 40A and 40B are connected to second and first inverter substrates 36B and 36A, respectively, at ground levels.

In each of the above described embodiments, the inverter circuits 56A and 56B may drive the cold cathode florescent lamps 34A and 34B in a timed manner such that induced interference between the adjacent lamps are be suppressed.

In the embodiments shown in FIGS. 4-6, the return cables 40A and 40B have been far shorter than those in the embodiment shown in FIG. 3. This is advantageous because it is no longer necessary to fix the return cable during fabrication of backlight assemblies.

Referring again to FIGS. 5 and 6, each of the first and second inverter substrates 36A and 36B has two connectors or ports, which are internally interconnected and can receive a power source 50 and inverter control signals 54. One of the connectors or ports of the first inverter substrate 36A is connected to one of the connectors of the second inverter substrate 36B via bus cables. The first and second inverter substrates 36A and 36B drive the linear light sources (lamps 34A and 34B) in a timed manner in response to the inverter control signals 54 supplied to the second inverter substrate 36B.

Specifically, a timing signal is generated by the second inverter substrate 36B which receive the inverter control signals 54 and communicates to the first inverter substrate 36A. The first and second inverter substrates 36A and 36B drive the linear light sources (lamps 34A and 34B) in response to the timing signal.

Although the invention has been shown and described with respect to certain embodiments, it is obvious that equivalent alterations and modifications will occur to others skilled in the art upon reading and understanding of the specification. The present invention includes all such equivalent alterations and modifications, and is limited only by the scope of the claims.

The present application claims the priority of Japanese Patent Application No. 2003-142952, filed May 21, 2003, the disclosure of which is hereby incorporated by reference in its entirety.

What is claimed is:

1. A backlight assembly comprising:
  a plurality of linear light sources each having a high-voltage end and a low-voltage end, arranged in parallel behind a display screen, the plurality of linear light sources being divided into a first group and a second group, the linear light sources belonging to the first group being oriented in a first direction, the linear light sources belonging to the second group being oriented in a second direction opposite to the first direction;
  a first inverter substrate having a plurality of first inverter circuits formed therein corresponding to the plurality of the linear light sources of the first group and configured for driving the linear light sources belonging to the first group in response to control signals from a first control signal input port associated therewith the first inverter substrate;
  a second inverter substrate having a plurality of second inverter circuits formed therein corresponding to the plurality of the linear light sources of the second group and configured for driving the linear light sources belonging to the second group in response to control signals from a second control signal input port associated therewith the second inverter substrate, the first and second inverter substrates being arranged on respectively opposite sides of the linear light sources,
  a first return substrate corresponding to the first inverter substrate and connected to the adjacent low-voltage ends of the plurality of linear light sources; and
  a second return substrates corresponding to the second inverter substrate and connected to the adjacent low-voltage ends of the plurality of linear light sources,
  wherein the first and second inverter substrates and the first and second return substrates are commonly grounded through a bus line.

2. The backlight assembly as claimed in claim 1, wherein a cycle of alternating orientation of the linear light sources is one.

3. The backlight assembly as claimed in claim 1, wherein the first and second inverter substrates are arranged across the plurality of linear light sources.

4. A liquid crystal display, comprising:
  two liquid crystal panels arranged to interpose therebetween the backlight assembly as claimed in claim 1.

5. The backlight assembly as claimed in claim 1, wherein the plurality of linear light sources are comprised of cold cathode fluorescent lamps.

6. The backlight assembly as claimed in claim 1, wherein the plurality of linear light sources are altered between the orientation in the first direction and the orientation in the second direction and a cycle of alternating orientation of the linear light sources is greater than one.

7. The backlight assembly as claimed in claim 6, wherein the adjacent two selected out of the plurality of linear light sources are oriented in the first and second directions, respectively.

8. The backlight assembly as claimed in claim 1, wherein each of the first and second inverter substrates has connectors that are internally interconnected and can receive a power source and inverter control signals;
  wherein the first and second inverter substrates drive the linear light sources in a timed manner in response to the inverter control signals supplied to one of the first and second inverter substrates.

9. The backlight assembly as claimed in claim 8, wherein a timing signal is generated by the one of the first and second inverter substrates which receive the inverter control signals and communicates to the other inverter substrate; and
  wherein the first and second inverter substrates drive the linear light sources in response to the timing signal.

10. The backlight assembly as claimed in claim 8, wherein the first inverter substrate is connected to the second inverter substrate.

* * * * *

UNITED STATES PATENT AND TRADEMARK OFFICE
CERTIFICATE OF CORRECTION

PATENT NO.        : 7,265,500 B2
APPLICATION NO. : 10/849433
DATED              : September 4, 2007
INVENTOR(S)     : Shin-ichirou Ono et al.

It is certified that error appears in the above-identified patent and that said Letters Patent is hereby corrected as shown below:

Title Page, item (73) Assignee: should read
 --NEC LCD Technologies, Ltd.
  Kanagawa (JP)--

Signed and Sealed this

Fifteenth Day of April, 2008

JON W. DUDAS
*Director of the United States Patent and Trademark Office*

UNITED STATES PATENT AND TRADEMARK OFFICE
CERTIFICATE OF CORRECTION

PATENT NO. : 7,265,500 B2 Page 1 of 1
APPLICATION NO. : 10/849433
DATED : September 4, 2007
INVENTOR(S) : Shin-ichirou Ono et al.

It is certified that error appears in the above-identified patent and that said Letters Patent is hereby corrected as shown below:

Title page, item (73) should read --Assignee: NEC LCD Technologies, Ltd.
Kanagawa (JP)--

Signed and Sealed this

Twenty-ninth Day of April, 2008

JON W. DUDAS
*Director of the United States Patent and Trademark Office*